US006950897B2

(12) United States Patent
Hensley et al.

(10) Patent No.: US 6,950,897 B2
(45) Date of Patent: Sep. 27, 2005

(54) METHOD AND APPARATUS FOR A DUAL MODE PCI/PCI-X DEVICE

(75) Inventors: Ryan J. Hensley, Dallas, TX (US); Jaideep Dastidar, Houston, TX (US); Timothy K. Waldrop, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1046 days.

(21) Appl. No.: 09/792,833

(22) Filed: Feb. 23, 2001

(65) Prior Publication Data

US 2002/0120805 A1 Aug. 29, 2002

(51) Int. Cl.⁷ .......................... G06F 13/10; G06F 13/92
(52) U.S. Cl. ....................... 710/305; 710/105; 710/306; 710/313; 710/314; 710/315
(58) Field of Search ................. 710/305, 306, 710/314, 315, 316, 317, 100, 105, 307

(56) References Cited

U.S. PATENT DOCUMENTS

| 5,793,989 | A | * | 8/1998 | Moss et al. ................. 710/105 |
| 5,892,964 | A | * | 4/1999 | Horan et al. ................. 712/33 |
| 6,167,476 | A | * | 12/2000 | Olarig et al. ................ 710/315 |
| 6,175,889 | B1 | * | 1/2001 | Olarig ........................ 710/309 |
| 6,449,677 | B1 | * | 9/2002 | Olarig et al. ................ 710/305 |
| 6,581,129 | B1 | * | 6/2003 | Buckland et al. ........... 710/306 |

FOREIGN PATENT DOCUMENTS

| EP | 878764 A2 | * | 11/1998 | ........... G06F/13/40 |
| JP | 11073386 A | * | 3/1999 | ........... G06F/13/36 |
| JP | 2000357154 A | * | 12/2000 | ........... G06F/13/36 |
| JP | 2001005774 A | * | 1/2001 | ........... G06F/13/36 |
| WO | WO 01/93052 A2 | * | 12/2001 | ........... G06F/13/38 |

OTHER PUBLICATIONS

PCI Special Interest Group, "PCI–X Addendum to the PCI Local Bus Specification", Jul. 24, 2000, Revision 1.0a, p. 113 and 208 of 240.*
Intel Corporation, "Accelerated Graphics Port Interface Specification", May 4, 1998, Revision 2.0, p. 25 of 259.*
IBM, "IBM introduces the industry's first standard PCI–X Bridge for increased I/O performance", Nov. 7, 2000, <http://www–306.ibm.com/chips/news/2000/001107/1107_pcix.html>.*
Prakash, Krishnamoorthy, "An Attempt to Completely Utilize the Bandwidth Capability of PCI–X□□133MHz Devices in a 66MHz PCI–X Local Bus.", 2000, IEEE Computer Society.*

* cited by examiner

Primary Examiner—Paul R. Myers
Assistant Examiner—Ryan Stiglic (57) ABSTRACT

A technique is disclosed for facilitating data processing in a computer system. The technique utilizes logic to implement a dual mode design for PCI/PCI-X computer systems that enables optimal efficiency in regardless of which mode the system is operating in. The technique involves the implementation of two sets of transmitting and receiving elements, one tuned to PCI protocol timing and the other to PCI-X protocol. Therefore, allowing the system to process both PCI and PCI-X transactions without adversely affecting the other functional mode. The technique also enables an operator to adjust the clock timing separately for each protocol without having a detrimental affect on the other operating protocol.

40 Claims, 4 Drawing Sheets

METHOD AND APPARATUS FOR A DUAL MODE PCI/PCI-X DEVICE

FIELD OF THE INVENTION

The present invention relates generally to PCI/PCI-X computer systems. Particularly, the present invention relates to circuitry for providing timing adjustment for dual mode devices.

BACKGROUND OF THE RELATED ART

This section is intended to introduce the reader to various aspects of art, which may be related to various aspects of the present invention, which are described and or claimed below. This discussion is believed to be helpful in providing the reader with background information to facilitate a better understanding of the various aspects of the present invention. Accordingly, it should be understood that these statements are to be read in this light, and not as admissions of prior art.

A conventional computer system typically includes one or more central processing units (CPUs) and one or more memory subsystems. Computer systems also include peripheral devices for inputting and outputting data. Some common peripheral devices include, for example, monitors, keyboards, printers, modems, hard disk drives, floppy disk drives, and network controllers.

One of the important factors in the performance of a computer system is the speed at which the CPU operates. Generally, the faster the CPU operates, the faster the computer system can complete a designated task. One method of increasing the speed of a computer is using multiple CPUs, commonly known as multiprocessing. However, the addition of a faster CPU or additional CPUs can result in different increases in performance among different computer systems. Although it is the CPU that executes the algorithms required for performing a designated task, in many cases it is the peripherals that are responsible for providing data to the CPU and storing or outputting the processed data from the CPU. When a CPU attempts to read or write to a peripheral, the CPU often "sets aside" the algorithm that is currently executing and diverts to executing the read/write transaction (also referred to as an input/output transaction or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction process associated therewith can create a bottleneck in the overall performance of the computer system. As the CPU becomes faster, the amount of time executing algorithms becomes less of a limiting factor compared to the time expended in performing an I/O transaction. Accordingly, the improvement in the performance of the computer system that could theoretically result from the use of a faster CPU or the addition of additional CPUs may become substantially curtailed by the bottleneck created by the I/O transactions. Moreover, it can be readily appreciated that any performance degradation due to such I/O bottlenecks in a single computer system may have a stifling effect on the overall performance of a computer network in which the computer system is disposed.

As CPUs have increased in speed, the logic controlling I/O transactions has evolved to accommodate these transactions. Thus, most I/O transactions within a computer system are now largely controlled by application specific integrated circuits (ASIC). These ASICs contain specific logic to perform defined functions. For example, Peripheral Component Interconnect (PCI) logic is instilled within buses and bridges, which govern I/O transactions between peripheral devices and the CPU. Today, PCI logic has evolved into the Peripheral Component Interconnect Extended (PCI-X) logic to form the architectural backbone of the computer system. PCI-X logic has features that improve upon the efficiency of communication between peripheral devices and the CPU. For instance, PCI-X technology increases bus capacity to more than eight times the conventional PCI bus bandwidth. For example, a 133 MB/s system with a 32 bit PCI bus running at 33 MHz is increased to a 1066 MB/s system with the 64 bit PCI bus running at 133 MHz.

An important feature of the new PCI-X logic is that it can provide backward compatibility with PCI enabled devices at both the adapter and system levels. Backward compatibility allows PCI controlled devices to operate with PCI-X logic. Although the devices will operate at the slower PCI speed and according to PCI specifications, the devices may be compatible to the new logic governing PCI-X transactions.

PCI-X logic provides an attribute phase that uses a 36-bit attribute field which describes bus transactions in more detail than the conventional PCI bus logic. This field includes information about the size of the transaction, the ordering of transactions, and the identity of the transaction initiator. Furthermore, the attribute field in the PCI-X standard incorporates the transaction byte count, which allows the bridge to determine exactly how much data to fetch from the memory.

PCI and PCI-X modes have different external bus timing requirements, and efforts to meet timing in one mode has a detrimental effect on the other mode. Typically, PCI mode specifications require devices operating in PCI mode to promote transactions in an asynchronous path from the input signal to an output register. Alternatively, the PCI-X specification does not facilitate an asynchronous functional path. Bridges within a computer system typically have one pathway that governs PCI and PCI-X transactions. However, because the two modes have differing timing approaches, a common pathway may cause timing problems. For example, a PCI transaction may transmit inaccurate data because the transaction is transmitted in a pathway common to both modes. These types of problems generally arise because of the different setup time and output time specified for each mode. For example, PCI 66 Mhz has an input setup time of 3 ns and a clock-to-output time of 6 ns, while PCI-X 100/133 Mhz has input setup time of 1.2 ns and a clock-to-output time of 3.8 ns.

The present invention may address one or more of the problems discussed above.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
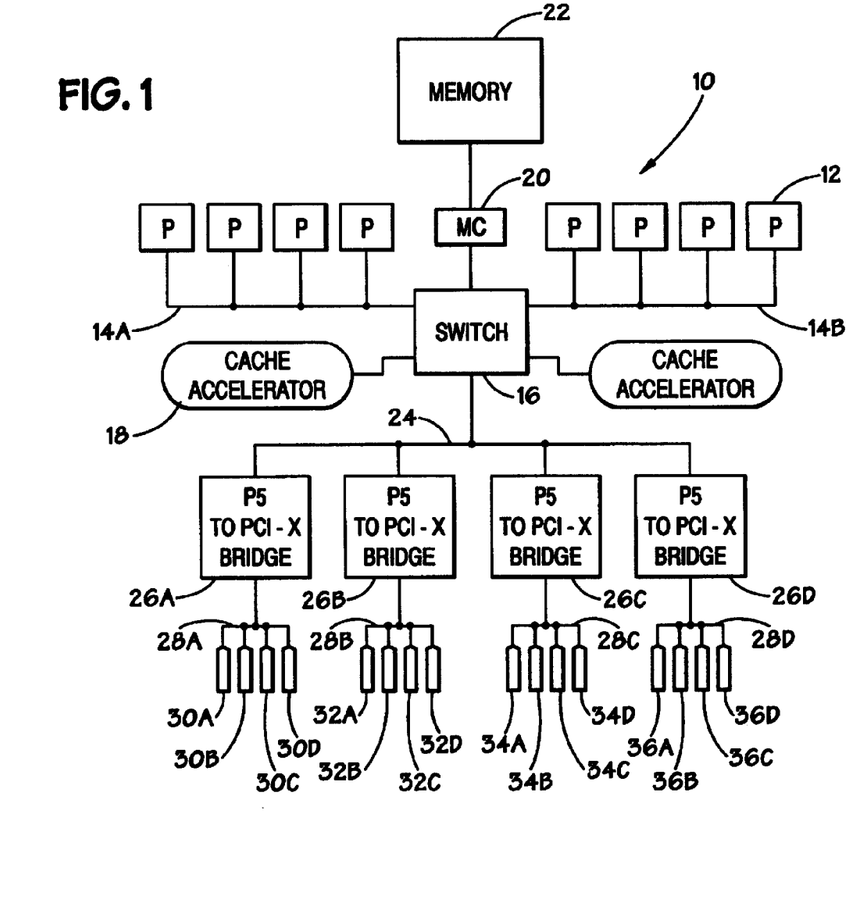
FIG. 1 illustrates a diagram of an exemplary computer system in accordance with the present invention.

Turning now to the drawings, and referring initially to FIG. 1, a multiprocessor computer system, for example a Proliant 8500 PCI-X from Compaq Computer Corporation, is illustrated and designated by the reference numeral 10. In this embodiment of the system 10, multiple processors 12 control many of the functions of the system 10. The processors 12 may be, for example, Pentium, Pentium Pro, Pentium II Xeon (Slot-2) or Pentium III processors available from Intel Corporation. However, it should be understood that the number and type of processors are not critical to the technique described herein and are merely being provided by way of example.

Typically, processors 12 are coupled to one or more processor buses. In this embodiment, half of the processors 12 are coupled to a processor bus 14A, and the other half of the processors 12 are coupled to a processor bus 14B. The processor buses 14A and 14B transmit the transactions between the individual processors 12 and a switch 16. The switch 16 routes signals between the processor bus 14A and 14B, cache accelerator 18, and a memory controller 20. A crossbar switch is shown in this embodiment, however, it should be noted that any suitable type of switch may be used in the operation of the system 10. The memory controller 20 may also be of any type suitable for such a system, such as, a Profusion memory controller. It should be understood that the number and type of memory, switches, memory controllers, and cache accelerators are not critical to the technique described herein and are merely being provided by way of example.

The switch 16 is also coupled to an input/output (I/O) bus 24. As mentioned above, the switch 16 directs data to and from the processors 12 through the processor buses 14A and 14B, as well as the cache accelerator 18 and the memory 22. In addition, data may be transmitted through the I/O bus 24 to one of the PCI-X bridges 26 A–D. Each PCI-X bridge 26 A–D is coupled to each one of the PCI-X buses 28 A–D. Further, each one of the PCI-X buses 28 A–D terminates at a series of slots or I/O interfaces 30 A–D, 32 A–D, 34 A–D, 36 A–D, to which peripheral devices may be attached. For example, in the present embodiment, PCI-X bridge 26A is coupled to bus 28A, and bus 28A is coupled to I/O interfaces 30 A–D. It should be noted that the PCI-X bridges 26 B–D, buses 28 B–D and I/O interfaces 32 A–D, 34 A–D, 36 A–D are similarly coupled.

Generally, each one of the PCI-X bridges 26 A–D is an application specific integrated circuit (ASIC). An ASIC, at least in this application, contains logic devices that process input/output transactions. Particularly, the ASIC may contain logic devices specifying ordering rules, buffer allocation, and transaction type, as well as logic devices for receiving and delivering data and for arbitrating access to the bus 28 A–D. Additionally, the logic devices may include address and data buffers, as well as arbitration and bus master control logic for the PCI-X buses 28 A–D. The PCI-X bridges 26 A–D may also include miscellaneous logic devices, such as counters and timers as conventionally present in personal computer systems, as well as an interrupt controller for both the PCI and I/O buses and power management logic.

Typically, a transaction is initiated by a requester, such as a peripheral device, e.g., tape drives, CD-ROM drives, or other peripheral storage devices, coupled to one of the I/O interfaces 30 A–D, 32 A–D, 34 A–D, and 36 A–D. The transaction is transmitted to one of the PCI-X buses 28 A–D depending on the peripheral device utilized and the location of the I/O interface 30 A–D–36 A–D. The transaction is then directed to the appropriate PCI-X bridge 26 A–D. It should be noted that logic devices within the bridge 26 A–D generally allocate a buffer where data may be stored. The transaction is directed to either the processors 12 or to the memory 22, depending on the type of transaction. When data is retrieved, the retrieved data is typically stored within the allocated buffer of the respective bridge 26 A–D. The data remains stored within the buffer until access to the PCI/PCI-X bus 28 A–D is granted so that the data may be delivered to the requesting device.

In the present embodiment, each one of the buses 28 A–D is potentially coupled to five requesting devices (four peripheral devices and one of the bridges 26 A–D). It should be noted that only one device may use a particular bus 28 A–D to transmit data at any given time. For instance, at any one clock cycle, only one of the requesting devices may use the bus 28A–D to transmit data. Thus, when a transaction is requested, the device may have to wait until the bus 28 A–D is available for access.

Regardless of whether a requestor operates according to PCI or PCI-X specifications, the PCI-X buses 28A–D and the PCI-X bridges 26A–D are capable of administering the request. As a transaction is initiated by a peripheral device, the I/O interface 30A–D checks to determine whether PCI-X or PCI specifications are used to manage the transaction. The transaction is then ordered within the respective bus 28A–D and transmitted to the respective bridge 28A–D. The transaction is processed, and the data is returned to the requester. Thus, the transaction is processed in either the PCI or PCI-X mode depending on the operating mode of the requester.

If both PCI and PCI-X transactions are transmitted through a common pathway in a bridge, timing differences in the two modes may produce inaccurate signals. The two types of modes have different external bus timing requirements. Therefore, efforts to establish timing in one mode may have a detrimental affect on transactions operating in the other mode. Generally, for a transaction operating in PCI mode, the total transaction time is about 9 ns. Typically, about 3 ns is utilized for the input setup time, and about 6 ns is used for the clock-to-output time. By way of contrast, in PCI-X mode, the total transaction time is generally about 5 ns, where the initial setup time is about 1.2 ns and clock-to-output time is about 3.8 ns.

As will be described in greater detail with reference to FIG. 2 and FIG. 3, the present technique provides a dual pathway within the bridge 26 A–D, so that the setup time and the output time may be met for every transaction regardless of the transaction protocol. One pathway is optimized for PCI transactions, and the other pathway is optimized for PCI-X transactions. In addition, the physical placement of certain logical devices within the bridge 26 A–D may affect timing. The dual pathway design facilitates the placement of certain logic devices in an advantageous manner to benefit both PCI and PCI-X protocol.

Figure 2:
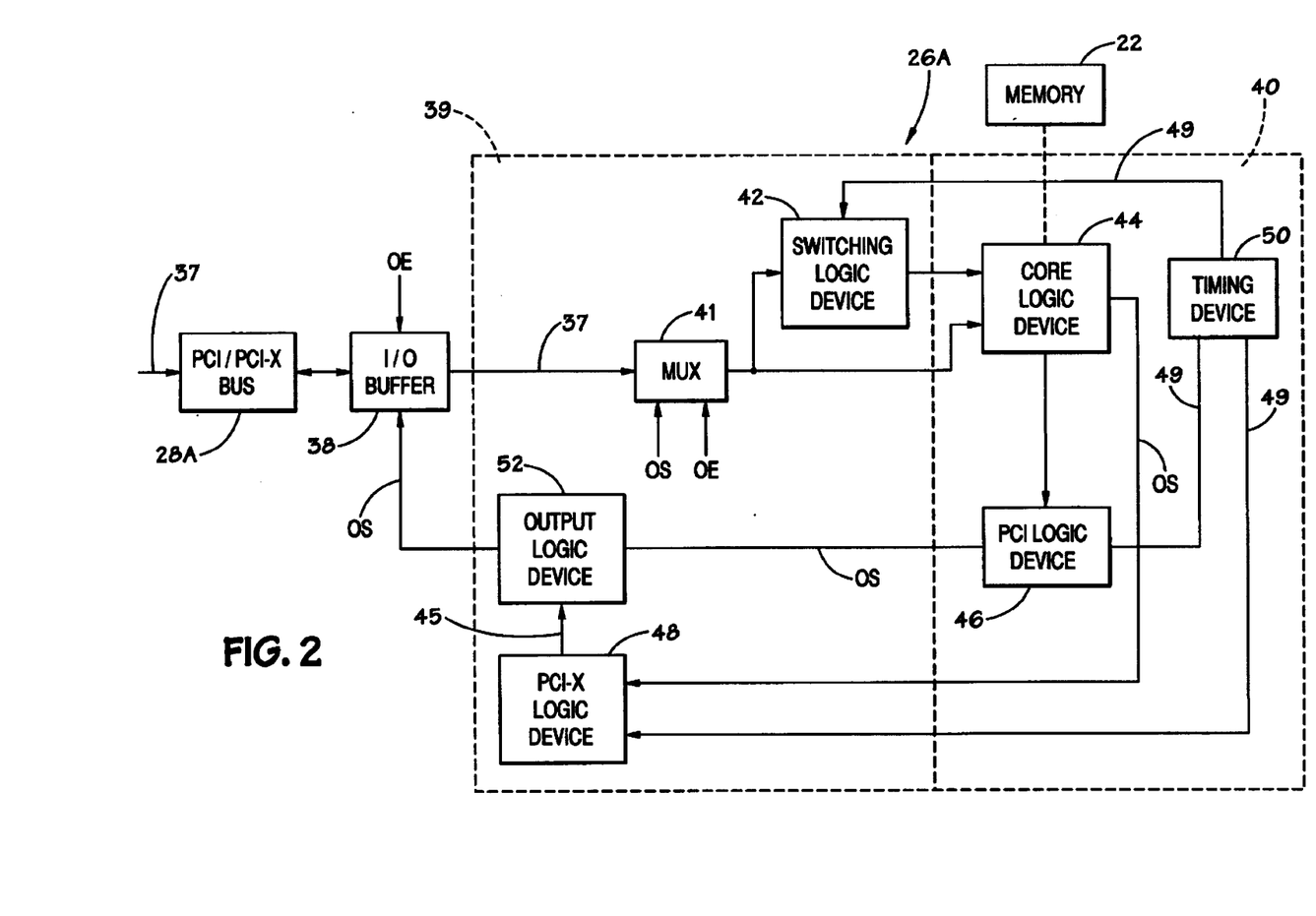
FIG. 2 illustrates a block diagram representing logic blocks in an exemplary bridge utilized in the present technique.

FIG. 2 is a block diagram illustrating an exemplary bridge 26A in the computer system 10. The other bridges 26 B–D may be identical to the bridge 26A. Typically, a transaction signal 37 is initiated by a peripheral device. Once the transaction signal 37 is initiated, the peripheral device requests access to the PCI/PCI-X bus 28A. Once access to the bus 28A–D is granted, the transaction signal 37 is transmitted to the bridge 26A. It should be understood that the transaction signal 37 may be any type of transaction request. Typically, the transaction signal 37 includes information regarding the identity of the transaction initiator, size of the transaction, and the transaction request.

The transaction signal 37 is directed from the bus 28A to an I/O buffer 38. The I/O buffer 38 is typically a bi-directional buffer. A bi-directional buffer enables one signal at a time to be transmitted in one direction or the other. In the present embodiment, an output enable signal OE generally drives the buffer 38. For example, when the output enable signal OE is disabled, the transaction signal 37 may be directed from the I/O buffer 38 to the bridge 26A. Alternatively, when the output enable signal OE is enabled, an output signal OS is transmitted from the I/O buffer 38 to the PCI/PCI-X bus 28A. The output signal OS and the output enable signal OE will be discussed in further detail with reference to FIG. 3.

The transaction signal 37 is transmitted to a multiplexer 41 from the I/O buffer 38. Subsequently, the multiplexer 41 transmits the transaction signal 37 to either the switching logic device 42 or to the core logic device 44. The multiplexer 41 is implemented in the present embodiment so that the PCI and the PCI-X requirements of not driving a signal and receiving a signal at the same time is satisfied. For example, when the output enable signal OE is enabled, the output signal OS is driven across the bus 28A. Concurrently, the output enable signal OE enables the multiplexer 41, so that the transaction signal 37 is not driven within the bridge 26A. When the output enable signal OE is disabled, the transaction signal 37 is multiplexed and transmitted to either the switching logic 42 or to a core logic device 44. Alternatively, when the output enable signal OE is enabled, an output signal OS from the PCI-X pathway is multiplexed and transmitted to the core logic device 44.

The transaction signal 37 is transmitted to the switching logic device 42 if the functional operating mode is PCI-X. Alternatively, if the functional operating mode is PCI and if the transaction data is requested in the next clock cycle, then the transaction signal 37 is transmitted directly to the core logic device 44. The transaction signal 37 is transmitted directly to the core logic device 44, because the switching logic device 42 takes a clock cycle to transmit the transaction signal 37. Thus, the transaction may not be processed by the next clock cycle if the transaction signal 37 is transmitted to the switching logic device 42. However, if the PCI transaction is not required to be completed in the next clock cycle, then the transaction signal 37 is transmitted to the switching logic device 42.

One purpose of the switching logic device 42 is to provide a time delay for PCI devices relative to PCI-X devices. The switching logic device 42 provides a mechanism for selecting the transaction signal 37 operating in the particular pathway, as discussed in detail below with reference to FIG. 3. Typically, a PCI/PCI-X mode signal enables the transaction signal 37 from one pathway to be directed to the core logic device 44. Thus, if the transaction is in the PCI protocol, then the pathway with the delay is selected. In the alternative, if the transaction is in the PCI-X protocol, then the pathway without the delay is selected. The delay in the PCI pathway is provided, because PCI operates slowly relative to PCI-X. Thus, a PCI transaction signal may be inaccurate if the pathway is designed to process PCI-X protocol. A more detailed description of the elements within the switching logic device 42 will be discussed further with reference to FIG. 3.

The core logic device 44 maintains various logic devices that perform the instructions transmitted by the transaction signal 37. For example, the transaction signal 37 may provide instructions to retrieve data from memory 22. Therefore, the output signal OS transmitted from the core logic device 44 may comprise data retrieved from the memory 22. The output signal OS may constitute any type of information regarding the processed transaction signal 37. Additionally, the core logic device 44 may also transmit the output enable signal OE. As mentioned above, the output enable signal OE drives the output signal OS in multiplexer 41 and the I/O buffer 38.

In the present embodiment, the output signal OS is transmitted to PCI logic device 46 and PCI-X logic device 48. The output signal OS is also transmitted to the PCI-X logic device 48. In the present embodiment, the PCI logic device 46 and the PCI-X logic device 48 contain latches to store the output signal OS and the output enable signal OE transmitted from the core logic device 44.

The output signal OS is transmitted to the output logic device 52 from the PCI logic device 46 and the PCI-X logic device 48. The output logic device 52 selects the particular output signal OS to transmit to the I/O buffer 38. If the transaction is a PCI transaction, then the output signal OS from the PCI logic device 46 is selected and transmitted to the I/O buffer 38. However, if the transaction is a PCI-X transaction, then the output signal OS from PCI-X logic device 48 is transmitted to the I/O buffer 38. Typically, the output logic device 52 contains multiplexers that select the appropriate signal based on the operating protocol.

In this embodiment, the output enable signal OE is transmitted simultaneously with the output signal OS. Once the output signal OS and the output enable signal OE are selected from the appropriate logic device, the signals are transmitted to the I/O buffer 38. The output enable signal OE enables the I/O buffer 38 so that the output signal OS may be transmitted to the PCI/PCI-X bus 28A. As mentioned above, the output enable signal OE drives the I/O buffer 38, so that the output signal OS may be transmitted to the PCI/PCI-X bus 28 A–D.

The bridge 26A further includes a timing device 50 that transmits a clock signal 49 to the switching logic device 42, the PCI logic device 46, and the PCI-X logic device 48. As explained in detail with reference to FIG. 3, the timing device 50 delays the clock signal 49 delivered to the PCI logic device 46 relative to the clock signal 49 delivered to the PCI-X logic device 48 to facilitate proper timing of these different signals.

It should be noted that the bridge 26A is composed of a logic block 39 and a logic block 40. To address the timing issues mentioned above, in this embodiment, the logic block 39 is located in close proximity to the I/O buffer 38 relative to the logic block 40. The PCI logic devices are located within the logic block 40, and the PCI-X logic devices are located within logic block 39. In this embodiment, for example, the bridge 26A is 9.18 mm in width and 9.18 mm in length. To facilitate transmission of the PCI-X signals, the PCI-X logic device 48 within the logic block 39 may be located as close to the I/O buffer 38 as reasonably possible, such as within 0.1 mm in one example. To facilitate the transmission of PCI signals, on the other hand, the PCI logic device 46 in the logic block 40 may be located may be located as close to the core logic device 44 as reasonably possible, although the logic block 40 is located further from the I/O buffer 38 than the logic block 39. In this example, for instance, the logic block 40 may be located generally in the center of the bridge 26A, or approximately 4.5 mm from the I/O buffer 38.

Figure 3:
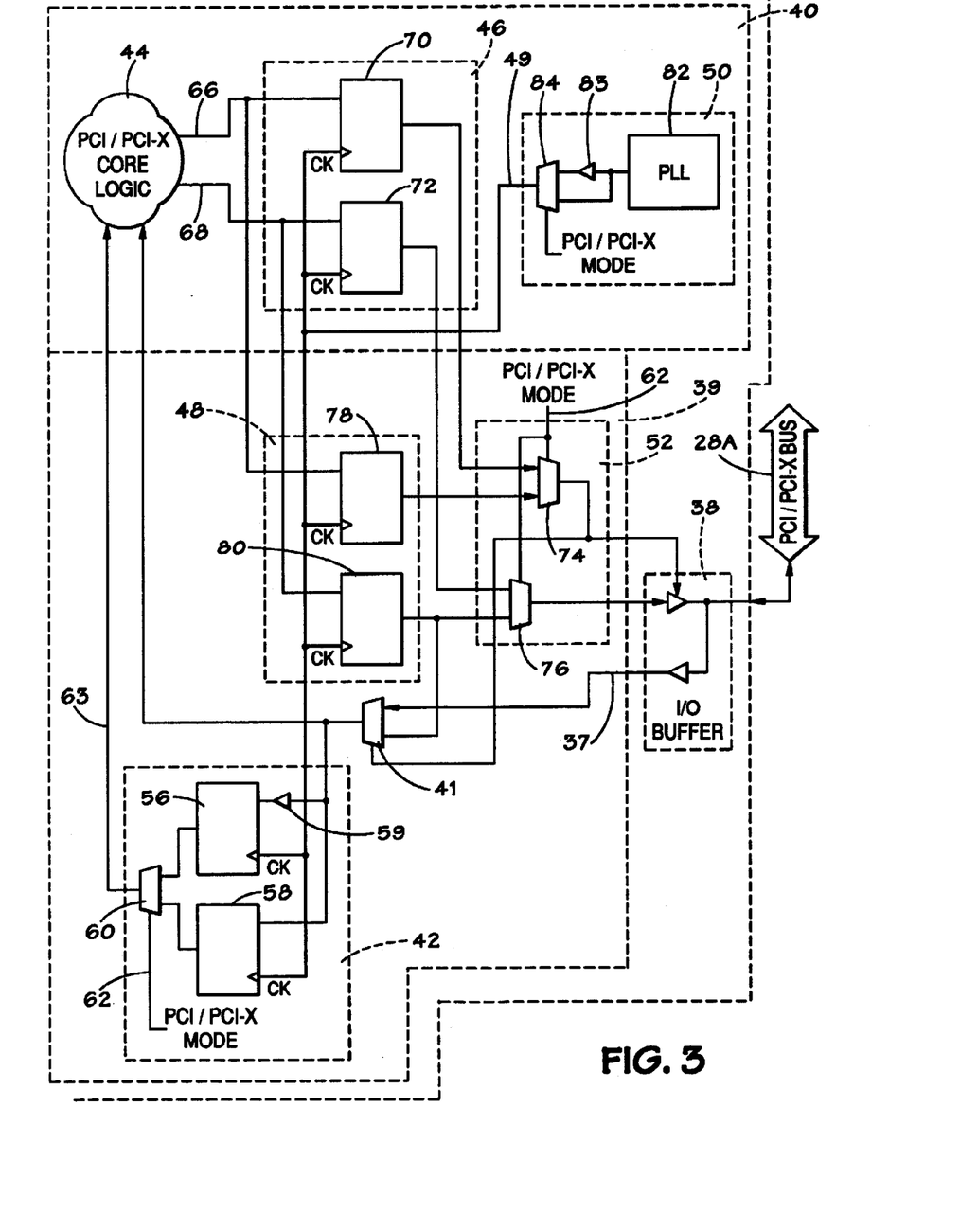
FIG. 3 is a circuit diagram illustrating components within the logic blocks of FIG. 2 in an exemplary bridge utilized in the present technique.

FIG. 3 is a more detailed illustration of the logic blocks of FIG. 2 implemented within the exemplary bridge 26A. In the present embodiment, the logic devices illustrated are located within an ASIC that forms one or more of the bridges 26A–D. However, it should be understood that the components utilized in the present technique may be implemented elsewhere in the system 10 to provide similar results.

As mentioned above, the transaction signal 37 is received by one of the PCI/PCI-X buses 28 A–D, such as the bus 28A, and transmitted to the corresponding bridge 26A. Typically, the transaction signal 37 is received by the I/O buffer 38 within the bridge 26 A. In the present embodiment, the I/O buffer 38 is a bi-directional buffer. However, other types of buffers may also be utilized to perform a similar function. The bi-directional buffer 38 inputs the transaction signal 37 when the output enable signal is disabled, and the buffer 38 outputs the output signal OS when the output enable signal is enabled.

The I/O buffer 38 transmits the transaction signal 37 to the multiplexer 41. The multiplexor 41 transmits the transaction signal 37 to either the switching logic device 42 or to the core logic device 44. If the transaction signal 37 is a PCI transaction and is requested in the next clock cycle, then the transaction signal 37 may be directly transmitted to the core logic device 44. Otherwise, the transaction signal 37 is transmitted to the switching logic device 42. Particularly, the transaction signal 37 is directed towards latches 56 and 58. The transaction signal 37 is then stored in latches 56 and 58, until the transaction signal 37 from one of the latches is multiplexed.

It should be understood that the transaction signal 37 is stored in the latches 56 and 58 regardless of whether the transaction signal 37 is a PCI signal or a PCI-X signal. If the transaction signal 37 is a PCI signal, a multiplexor 60 selects the signal stored in the latch 56 of the PCI pathway. However, if the transaction signal is a PCI-X signal, the multiplexor 60 selects the signal stored in the latch 58 of the PCI-X pathway.

In the PCI pathway, a buffer 59 is provided to maintain the accuracy of a PCI signal. The buffer 59 provides a time delay so that the PCI signal that is stored in the latch 56 is not replaced by the next transaction signal 37. If a delay is not provided in PCI pathway, the PCI signal stored in latch 56 may be replaced prematurely and, thus, be inaccurate. Indeed, since a PCI signal is stored in the latch 58 as well, it may be prematurely replaced by the next transaction signal 37 because the PCI-X pathway does not include a buffer. Therefore, if the transaction signal 37 represents a PCI transaction, the signal 37 stored in the latch 56 is selected by the multiplexor 60. Specifically, a PCI/PCI-X mode signal 62 enables the multiplexor 60 to select the transaction signal 37 from either latch 56 or latch 58 to be multiplexed into line 63, depending on the functional protocol operating the transaction.

In the PCI-X pathway, on the other hand, a buffer is not provided. Although a PCI signal stored in the latch 58 may be prematurely replaced, a PCI-X signal stored in the latch 58 will not be prematurely replaced by the next transaction signal. However, a PCI-X signal stored in the latch 56 may be inaccurate, because the delay produced by buffer 59 does not allow the PCI-X signal to maintain the setup time for PCI-X transactions. Therefore, if the transaction signal represents a PCI-X transaction, the signal 37 stored in the latch 58 is selected by the multiplexor 60.

The multiplexed transaction signal 37 is then directed to the core logic device 44. Once the transaction signal 37 is registered in the core logic device 44, the transaction signal 37 initiates the appropriate PCI or PCI-X protocol. Specifically, the core logic device 44 processes the transaction requests designated by the transaction signal 37, such as enabling delivery of data, initiating arbitration algorithms, and performing other such functions. The transaction signal 37 may carry various types of information to initiate various types of processes within the system 10. Typically, once the transaction request is processed, an output enable signal 66 and an output signal 68 are produced. The output enable signal 66 and the output signal 68 are transmitted to the PCI logic device 46 and the PCI-X logic device 48. The output signal 68 generally comprises information requested by the processed transaction. The output enable signal 66 typically signals a buffer, such as the I/O buffer 38, to drive a particular signal as described previously. In the present embodiment, the output enable signal 66 acts to drive the I/O buffer 38 to transmit the output signal 68 to the PCI/PCI-X bus 28A.

The PCI logic device 46 typically comprises latches 70 and 72. The latch 70 receives the output enable signal 66 from the core logic device 44, and the latch 72 receives the output signal 68 from the core logic device 44. The output enable signal 66 is then directed to the output logic device 52. Particularly, the output enable signal 66 is transmitted to the multiplexer 74. Likewise, the output signal 68 is transmitted to the output logic device 52 and particularly, to the multiplexer 76.

It should be noted that the output enable signal 66 and the output signal 68 is also directed to the PCI-X logic device 48. The signals 66 and 68 are transmitted to the PCI-X logic device 46 at the same time as when the signals 66 and 68 are transmitted to the PCI logic device 48. Thus, the output enable signal 66 and the output signal 68 are also input into the latches 78 and 80, respectively. The output enable signal 66 and the output signal 68 are transmitted from the PCI-X logic block 48 to the multiplexers 74 and 76, respectively. The multiplexer 74 selects the output enable signal 66 from either the latch 70 or latch 78.

If the transaction is a PCI transaction, the multiplexer 74 selects the output enable signal 66 from the latch 70 and transmits the signal 66 to the I/O buffer 38. However, if the transaction is a PCI-X transaction, the multiplexor 74 selects the output enable signal 66 from the latch 78 and transmits the signal 66 to the I/O buffer 38. It should be noted that the PCI/PCI-X mode signal 62 provides information to the multiplexers 74 and 76 indicating the functional mode driving the transaction. If the transaction is a PCI transaction, the output signal 68 is selected from latch 72 by the multiplexer 76 and transmitted to the I/O buffer 38. Similarly, if the transaction is a PCI-X transaction, the output signal 68 is selected from latch 80 by the multiplexer 76 and transmitted to the I/O buffer 38.

As mentioned above, the output enable signal 66 drives the I/O buffer 38, so that the output signal 68 may be transmitted to the bus 28A. However, if a new transaction signal is being received from the PCI/PCI-X bus 28A, then the output enable signal 66 is disabled within the I/O buffer 38. Therefore, the output signal 68 is not transmitted to the PCI/PCI-X bus 28A.

FIG. 3 also illustrates the timing device 50 implemented within the bridges 26A–D. The timing device 50 is primarily utilized to provide the clock signal 49 to the logic devices utilized in the present technique. Particularly, the timing device 50 transmits a clock signal 49 to the switching logic device 42 and to the PCI and PCI-X logic devices 46 and 48. In this exemplary embodiment, the timing device 50 includes a phase locked loop (PLL) device 82, which provides the clock signal 49 to latches 70,72, 78, 80, 56, and 58. The timing device 50 also incorporates a buffer 83 and a multiplexer 84. The buffer 83 is provided so that the proper clock signal 49 may be transmitted to the logic devices. More particularly, the buffer 83 provides a delayed clock signal 49 to logic devices controlling PCI transactions. The delay is provided so that the PCI transactions are maintained properly because of the slower operating speed of the PCI transactions relative to the PCI-X transactions. Specifically, the buffer 83 provides a clock delay to the latches 56, 70, 72, which are devices located on the PCI pathway. Thus, the timing device 50 is provided so that an adjustment is made between transactions operating in PCI and PCI-X. The clock signal 49 that bypasses the buffer 83 is selected by multiplexer 84 for PCI-X transactions. Specifically, the PCI/PCI-X mode signal 62 enables the multiplexer 84 so that the proper signal for the transaction may be selected. It should be noted that the timing device 50 typically is coupled to the entire system 10. Thus, a common clock signal 49 is provided for the entire system 10. It should be further noted that regardless of the functional mode the device is operating in, all the logic devices are provided the clock signal 49.

As discussed above, the logic block 39 may be located in close proximity to the I/O buffer 38, whereas the logic block 40 may be located near the center of the bridge 26A. The proximity of the logic block 39 facilitates the delivery of the output signals to the peripheral devices. Thus, in PCI-X mode, the output time is satisfied if the logic devices governing PCI-X transactions are located in close proximity to the I/O buffer 38. Conversely, because in PCI mode the output time is greater, the PCI logic devices 46 may be located within logic block 40 further from the I/O buffer 38. Further, the proximity of the PCI logic devices 46 to the core logic device 44 allows the setup time for PCI transactions to be satisfied.

Figure 4:
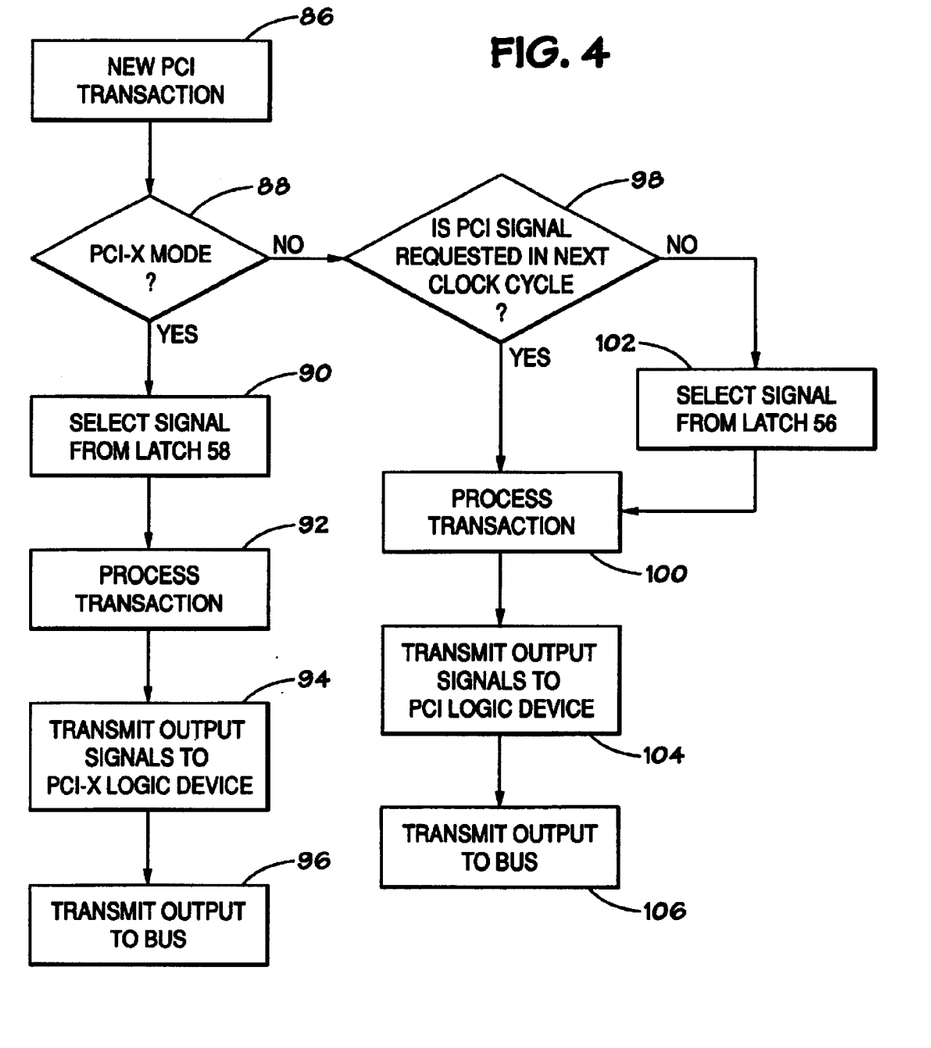
FIG. 4 is a flowchart representing an exemplary method of providing timing closure for a dual mode PCI/PCI-X device.

FIG. 4 is a flowchart representing the method utilized for accommodating dual mode devices in a PCI/PCI-X computer system 10. First, the system 10 determines if a new transaction has been initiated (block 86). Typically, a transaction signal 37 initiating the transaction is received by one of the buses 26A–D from a peripheral device. Next, the system 10 determines whether the transaction is a PCI-X transaction (block 88). If the transaction is governed by the PCI-X protocol, then the transaction signal 37 is transmitted through the bridge 26 A–D and is stored in latches 56 and 58. Because the transaction is governed by the PCI-X protocol, the transaction signal from latch 58 is selected and transmitted to the core logic device 44 (block 90). The transaction is processed by the core logic device 44 (block 92). The output signals 66 and 68 produced by the processed transaction signal 37 are then transmitted to the PCI-X logic device 48 (block 94). Subsequently, the output is transmitted to the PCI/PCI-X bus 28 A–D from the I/O buffer 38 (block 96).

If the transaction is not governed by the PCI-X protocol, then the system 10 determines whether the output for the transaction is requested in the next clock cycle (block 98). If the transaction output is requested in the next clock cycle, then the transaction is transmitted to the core logic device 44 and processed accordingly (block 100). However, if the output is not requested in the next clock signal, then the transaction signal 37 stored in latch 56 is transmitted to the core logic device 44 (block 102). The transaction is then processed according to the PCI protocol (block 100). The output is transmitted to the PCI logic device 46 where the signals may be stored until they are multiplexed (block 104). Next, the output signal 68 is transmitted to the bus 28 A–D, and the data is transmitted to the requesting device according to the PCI protocol (block 106).

It should be understood that because there are no asynchronous functional logic paths in PCI-X mode, there is little difficulty in achieving the input setup time. The output time may be satisfied by placing the latches 78 and 80 physically closer to the PCI/PCI-X bus 28 A–D. However, if the buffer 59 is utilized, the output time would be jeopardized for PCI-X transactions. Thus, in PCI-X mode, the non-delayed latch and the use of latches 78 and 80 placed closer to the PCI/PCI-X bus 28 A–D minimizes the interconnect delay on the output timing path.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for providing accurate transaction output for dual mode PCI/PCI-X devices initiated in a computer system, wherein the method comprises the acts of:
    (a) receiving an input signal from a requesting device, wherein the input signal is transmitted through a PCI/PCI-X bus to a bridge;
    (b) transmitting the input signal to a core logic device in a PCI functional path, if the input signal is initiated by a PCI device;
    (c) transmitting the input signal to the core logic device in a PCI-X functional path, if the input signal is initiated by a PCI-X device;
    (d) transmitting an output signal from the core logic device to the PCI/PCI-X bus in the PCI functional path, if the input signal was initiated by a PCI device; and
    (e) transmitting the output signal from the core logic device to the PCI/PCI-X bus in the PCI-X functional path, if the input signal was initiated by a PCI-X device.

2. The method as in claim 1, wherein act (a) comprises receiving the input signal from one of a plurality of requesting devices.

3. The method as in claim 1, wherein the core logic device comprises logic devices to process the input signal.

4. The method as in claim 1, wherein act (b) comprises delaying the input signal in the PCI functional path.

5. The method as in claim 1, wherein act (d) comprises transmitting the output signal to latches in proximity to the core logic device.

6. The method as in claim 1, wherein act (e) comprises transmitting the output signal to the latches in proximity to the PCI/PCI-X bus.

7. The method as in claim 1, wherein the method comprises transmitting a common clock signal to the PCI and PCI-X functional paths.

8. The method as in claim 1, wherein acts (a) through (e) are performed in recited order.

9. A system for providing accurate transaction output for dual mode PCI/PCI-X devices initiated in a computer system comprising:
- means for receiving an input signal from a requesting device, wherein the input signal is transmitted through a PCI/PCI-X bus to a bridge;
- means for transmitting the input signal to a core logic device in a PCI functional path, if the input signal is initiated by a PCI device;
- means for transmitting the input signal to the core logic device in a PCI-X functional path, if the input signal is initiated by a PCI-X device;
- means for transmitting an output signal from the core logic device to the PCI/PCI-X bus in the PCI functional path, if the input signal was initiated by a PCI device; and
- means for transmitting the output signal from the core logic device to the PCI/PCI-X bus in the PCI-X functional path, if the input signal was initiated by a PCI-X device.

10. The system as in claim 9, wherein means for receiving comprises means for receiving the input signal from one of a plurality of requesting devices.

11. The system as in claim 9, wherein the system comprises means to process the input signal in the core logic.

12. The system as in claim 9, wherein the system comprises means for delaying the input signal in the PCI functional path.

13. The system as in claim 9, wherein the system comprises means for transmitting the output signal to latches in proximity to the core logic device.

14. The system as in claim 9, wherein the system comprises means for transmitting the output signal to the latches in proximity to the PCI/PCI-X bus.

15. The system as in claim 9, wherein the system comprises means for transmitting a common clock signal to the PCI and PCI-X functional paths.

16. A method for providing transaction output for dual mode PCI/PCI-X devices initiated in a computer system, wherein the method comprises the acts of:
- (a) receiving an input signal from a requesting device, the signal being in one of a PCI format and a PCI-X format;
- (b) transmitting the input signal along a first path and a second path, the first path being delayed relative to the second path;
- (c) processing the input signal on the first path if the input signal is in the PCI format; and
- (d) processing the input signal on the second path if the input signal is in the PCI-X format.

17. The method as in claim 16, wherein act (a) comprises receiving a functional signal indicating that the input signal is in either the PCI format or the PCI-X format.

18. The method as in claim 16, wherein act (b) comprises delaying the input signal in the first path using a buffer.

19. The method as in claim 16, wherein the input signal from the first path and the second path is processed in the core logic device.

20. The method as in claim 16, wherein the method comprises receiving a common clock signal for the first path and the second path.

21. The method as in claim 16, comprises processing the input signal on a third path if the input signal is in PCI format.

22. The method as in claim 21, wherein if an output signal is requested on a clock signal directly after an initial clock signal, processing the input signal on the third path.

23. The method as in claim 16, wherein acts (a) through (d) are performed in the recited order.

24. A method in a bridge having a core logic device and an input/output buffer, the method comprising the acts of:
- (a) transmitting a signal from the core logic device to a PCI latch and to a PCI-X latch, the PCI latch being positioned proximate the core logic device and the PCI-X latch being positioned proximate the input/output buffer;
- (b) transmitting the signal from the PCI latch to the I/O buffer if the signal is in PCI format; and
- (c) transmitting the signal from the PCI-X latch to the I/O buffer if the signal is in PCI-X format.

25. The method as in claim 24, comprises transmitting a common clock signal to the PCI latch and the PCI-X latch.

26. The method as in claim 25, wherein the common clock signal is delayed if transmitting to the PCI latch.

27. The method as in claim 24, wherein the I/O buffer receives and transmits signals from a PCI/PCI-X bus.

28. The method as in claim 24, comprises transmitting a functional mode signal to the bridge indicating the PCI format.

29. The method as in claim 24, comprises transmitting a functional mode signal to the bridge indicating the PCI-X format.

30. The method as in claim 24, wherein acts (a) through (c) are performed in recited order.

31. A computer system comprising:
- at least one processor;
- a bridge operatively coupled to the at least one processor;
- a bus operatively coupled to the bridge and to a plurality of peripheral devices; and
- a plurality of logic devices configured to store and select an input signal transmitted from one of the plurality of peripheral devices operating in a PCI format and a PCI-X format, the input signal transmitted in a first path according to the PCI format or the input signal transmitted in a second path according to the PCI-X format, wherein the input signal is transmitted to a core logic device, and an output signal is transmitted from the core logic device to one of the plurality of peripheral devices.

32. The computer system as in claim 31, wherein one of the plurality of logic devices is a switching logic device.

33. The computer system as in claim 32, wherein the switching logic device comprises a first and a second latch and a multiplexer.

34. The computer system as in claim 31, wherein the input signal stored in the first latch is in the first path and the input signal stored in the second latch is in the second path.

35. The computer system as in claim 31, wherein the core logic device processes the input signal.

36. A method for manufacturing a system for providing accurate transaction output from a computer system to a plurality of requesting devices, the method comprising the acts of:
- (a) providing logic devices for receiving an input signal from one of the plurality of requesting devices, wherein the input signal is transmitted through a PCI/PCI-X bus to a bridge;
- (b) providing logic devices for the input signal to be transmitted to the core logic device from the PCI/PCI-X bus in a PCI functional path; and (c) providing logic devices for the input signal to be transmitted to the core logic device from the PCI/PCI-X bus in a PCI-X functional path.

37. The method as in claim 36, wherein act (a) comprises providing input/output buffers.

38. The method as in claim 36, wherein act (a) comprises providing a timing logic device, the timing logic device being adapted to provide a clock signal to the logic devices.

39. The method as in claim 36, wherein act (b) comprises providing latches to store signals received in the PCI functional path.

40. The method as in claim 36, wherein act (c) comprises providing latches to store signals received in the PCI-X functional path.

* * * * *